Patented May 14, 1946

2,400,091

UNITED STATES PATENT OFFICE 2,400,091

MOLDING PROCESS

Johannes Alfthan, New York, N. Y., assignor to E. I. du Pont de Nemours & Company, Wilmington, Del., a corporation of Delaware No Drawing. Application September 20, 1944, Serial No. 555,033

2 Claims. (Cl. 18—47.5)

This invention relates to a process for obtaining shaped articles from polytetrafluoroethylene.

Polytetrafluoroethylene is described in United States Patent 2,230,654 as a white or brown powder or jelly which becomes incandescent in the presence of a flame but which does not burn when the flame is removed and melts only at red heat. This patent also states that by the use of sufficiently high pressure and temperature the polymer can be molded into articles which are relatively clear and colorless. However, methods generally used for shaping thermoplastics, such as injection molding and extrusion, have been impractical or uneconomical on a manufacturing scale because of the peculiar, difficult fusibility which is characteristic of polytetrafluoroethylene.

Polytetrafluoroethylene undergoes a reversible transition at 327° C. Above this temperature the polymer is transparent in thick sections, is markedly less crystalline as shown by X-ray diagrams and has a very low tensile strength. On cooling below 327° C. the polymer becomes translucent or opaque, becomes more crystalline, and regains its tensile strength. However, above 327° C., and even at temperatures as high as 450° C., the polymer assumes none of the ordinary properties of a liquid or fluid. It retains its physical form and can be deformed under compressive stress only slowly indicating a very high viscosity. This behavior differs from that of other thermoplastics from which shaped articles can be obtained by conventional shaping techniques.

Shaped articles of polytetrafluoroethylene can be prepared by subjecting the polymer in the form of discrete particles to pressure in order to shape the desired article. The shaped article is then sintered by heating at a temperature of 327°–500° C. and then cooled. The shaped article shrinks during the heating treatment to form a dense compact tough article. I have now discovered a process for shaping this polymer whereby the resulting articles have porous structures which markedly improve them for some purposes, and also adapt them to valuable uses for which the previously known more compact products are unsuited.

This invention has as an object a method for forming new and novel articles of polytetrafluoroethylene. A further object is the manufacture of articles of polytetrafluoroethylene having any desired degree of porosity. Other objects will appear hereinafter.

I have found that when the polymer has received an initial heat treatment of at least 327° C. prior to the procedure previously outlined comprising shaping the finely divided polymer and sintering, that the shaped polymer expands during heating while the individual particles become welded together to yield a flexible article having a porous structure.

More particularly the above objects are accomplished by a method comprising heating polytetrafluoroethylene at a temperature within the range 327°–500° C., cooling, mechanically subdividing the polymer to a particle size less than about 20 mesh, shaping the polymer into the form of the desired article by subjecting the resulting discrete particles of the polymer to pressure, heating the shaped polymer to a temperature within the range 327°–500° C., and cooling the resulting article.

The initial or first heating step which may be referred to as pre-sintering or pre-baking is best carried out at a temperature of from 350° C. to 450° C. The time required for the initial heating step is that necessary to heat the polymer throughout to the mentioned temperature and depends on the mass of polymer being treated. In general, a heating period of from one-quarter hour to two hours is satisfactory.

Subdivision of the polymer following the initial heating step can be accomplished by a variety of mechanical methods such as with a hammer mill, a stamping mill, an attrition mill, a Raymond mill, or a rotary cutter. Polymer previously fabricated by processes involving heat treatment of 327° C. and above can be employed at this stage of the process, thus providing an outlet for scrap polymer articles.

The polymer should be subdivided to a particle size less than about 20 mesh. Since the porosity of the resulting molded article is a function of the particle size of the mechanically subdivided polymer, it is preferable, although not essential, to screen the subdivided polymer and to employ polymer of fairly uniform particle size for the pressing operation. The polymer particles should not be smaller than will pass a 300 mesh screen and these particles can be employed in this process to obtain the present microporous molded articles.

The finely divided polymer is shaped to form the desired article by cold pressing in a mold, that is, pressing at a temperature below 327° C. and preferably at room temperature. Pressures of from 100 to 3000 lbs./sq. in. are most desirably employed in shaping the polymer particles in the mold. In some instances, depending on the shape, size, and porosity of the article desired, considerably lower pressures, for example, 25 lbs./sq. in., can be used. In other instances much higher pressures, up to 50,000 lbs. or more per square inch are used.

The heat treating or sintering step applied after removing the pressed article from the mold is best conducted at a temperature of from 327° to 450° C. and is continued until the entire mass of the article achieves a temperature of at least 327° C. and preferably 350°–450° C. The time required for this will vary with the dimensions of the article. The extent of the sintering period necessary to give uniform articles can be determined for an article of any dimensions by a simple experiment with a sample piece of such dimensions having a thermo-couple in the center or centers of massive portions. An operating cycle can be set up for sintering pieces of such dimensions by noting the time required to achieve a temperature of at least 327° C., and preferably 350°–450° C., throughout the mass.

This heating step, as well as the initial heating step, can be carried out in a number of ways, such as by heating in air, heating in the vapor of a boiling liquid, or by immersion in a hot liquid, such as hot oil, a molten inorganic salt or a mixture of these, or a molten metal or alloy.

At the conclusion of the second heating or sintering operation, the article is removed from the hot zone and cooled. Articles particularly valuable with regard to resilience are obtained by forced cooling of the hot article as, for example, by quenching in a cold medium. This quenching operation can be conducted by subjecting the hot article to a blast of cold air or by immersing it in a cold liquid medium such as water, lubricating oil, quenching oil, or other organic liquids. The preparation of a porous article in which the pores are filled with a liquid, such as a lubricating oil, can be advantageously achieved by quenching the hot sintered article in the desired liquid.

The sintered article can also be cooled slowly instead of by quenching. This can be carried out, for example, by introducing the sintered article into a hot atmosphere or a hot liquid and slowly reducing the temperature of the medium. This controlled cooling is especially important in instances where distortion is likelly to occur as in the preparation of intricately shaped articles. Another procedure is to surround the sintered article with insulating material such as magnesite, asbestos, etc., so that the temperature of the hot article is reduced slowly. Articles produced by this technique are somewhat softer and less stiff than quenched articles. They are often preferred for certain types of subsequent machining operations.

It is quite surprising that a thermoplastic material can be sintered in this fashion without the use of any external means for retaining its shape. This property of polytetrafluoroethylene, unique among thermoplastics, makes it possible to carry out the heat-treating step quickly and without the use of any device to retain the shape of the pressed article. Such a process has many technical advantages, such as speed of operation and simple machinery requirements. For example, when producing articles on a large scale, the cold-formed articles can be conducted through a hot zone on a conveyor belt or on a conveyor chain, being attached thereto by tongs or other grasping devices.

This sintering operation transforms the soft, fragile, relatively compact article into one which is flexible and porous. The cold-pressed article generally expands somewhat during sintering, the expansion being uniform and dependent in extent on the particle size and on the pressure employed in the cold pressing step. This expansion is readily reproducible under a given set of operating conditions. It is pointed out that expansion is not invariably observed and that employment of polymer having extremely small particle size and a low pressure in the cold pressing operation can result in dimensions of the article remaining unchanged or even diminishing slightly during sintering. However, the density of articles prepared according to the process is invariably less than that of articles prepared by other processes in which the polymer is not subjected to an initial heat treatment.

Articles prepared from polytetrafluoroethylene by the method described herein are relatively hard, and are inert to the attack of organic and inorganic reagents. The invention is further illustrated by the following examples.

*Example I*

Scrape polytetrafluoroethylene resulting from machining operations on articles formed from this polymer which had been heated above 327° C. during the shaping, is subdivided in a Ball and Jewel cutter. The resulting polymer is then further subdivided in a micropulverizer to a particle size less than 20 mesh. This polymer is compacted into cylindrical shapes 3" in diameter by ¼" thick by pressing in a cylindrical mold at room temperature under 2,000–3,000 lbs./sq. in. These discs or chips are removed from the molds and are heated for ½ hour at 350° C. by immersion in a fused eutectic of sodium and potassium nitrites. The chips are then removed from the heating medium and placed between blocks of magnesia to cool slowly. When cool they are washed free of the heat-transfer salt with water. The resulting chips are expanded to almost twice their original thickness; they are quite porous and somewhat flexible.

*Example II*

Polytetrafluoroethylene in the form of discrete particles as removed from a polymerization reactor is baked at 400° C. for 1½ hours in an oven and then cooled. The polymer is then micropulverized and subjected to separation in a series of screens. Polymer having a particle size of 40–60 mesh is compressed in a mold at room temperature to a chip 2" in diameter and ¼" thick, employing a pressure of 2000 lbs./sq. in. This chip is then removed from the mold and sintered at 380° C. for 1½ hours and then cooled in air sandwiched between hot metal plates to eliminate warping. The chip has expanded to a diameter of 2⅛" and a thickness of ⅜".

The sides of the chip are sealed with cellulose tape and the chip is then set on the ground glass top of a filter flask. A concentrated nitric acid solution is readily filtered through the porous disc by application of suction to the filter flask; there is no damage to the filter disc.

*Example III*

Fifty parts of previously baked polytetrafluoroethylene was micropulverized through a micropulverization screen, the opening of which measured 0.039". This was intimately mixed with 50 parts of similarly micropulverized unbaked polytetrafluoroethylene and pressed into a ring 2⅜" outside diameter, by 1⅛" inside diameter and 3/32" thick, at a pressure of 5,230 lbs./sq. in. The article was placed in an air oven at 360–365° C. for 1½ hours. It was then removed from the oven and quenched in water at 25° C. The baked article was porous and very tough. Its dimensions were 2¼" outside diameter, 1 1/16" inside diameter and 10/32" thick. A ring made entirely from previously baked polymer under similar conditions was considerably more porous.

The polytetrafluoroethylene used in the process of this invention can be prepared by heating tetrafluoroethylene under superatmospheric pressure in the presence of a catalyst, for example, at a pressure above 1000 lbs./sq. in., a temperature of from 80°–150° C. and using oxygen or an organic peroxy compound as a catalyst. Lower temperatures and pressures are operable for this preparation although with an increase in the time required to effect the polymerization.

The heat treating or sintering operation which is carried out after removing the article from the mold in which it has been cold pressed can be satisfactorily carried out by subjecting the article to a hot atmosphere, such as by heating in an electrical furnace, a gas furnace, or any other type of hot air heating device. Contrary to what might be expected of an organic material, it is not necessary to conduct this step in an inert atmosphere, since no deleterious effects result from heating the cold pressed article in air. This step can also be conducted by placing the pressed article in a hot liquid, such as a hot oil, a molten metal or alloy, or in a molten mixture of inorganic salts. This step can also be accomplished by methods involving the use of radiant energy or high frequency electrostatic fields.

Articles of polytetrafluoroethylene can be converted into complex shapes by a variety of machining operations, such as sawing, drilling, punching, shaping, milling, turning on a lathe, and grinding. By these and other well known techniques articles of polytetrafluoroethylene having a wide variety of shapes and functions can be prepared.

The process of this invention can be used to form articles from not only pure polytetrafluoroethylene but also from mixtures of the polymer in preponderant amount with minor amounts of other materials, such as copper, iron, lead, brass, bronze, graphite, asbestos, silica, calcium fluoride, sodium chloride, ammonium chloride, ammonium nitrate, titanium dioxide, etc. These materials are generally added in the powder form but in some instances can be added in the form of fibers, for example, asbestos, glass, etc. If desired the porosity of the article can be increased by incorporating in it a thermostable water-soluble material such as sodium chloride and subsequently removing this from the sintered article by elution with water. The pore size can also be increased by incorporating in the polymer prior to the cold pressing step a substance which is thermolabile at the temperature required for sintering, such as ammonium nitrate, ammonium thiocyanate, paraffin wax, polyethylene, or nitrocellulose. Thus, during the sintering step such material will be decomposed into gaseous products which facilitate the expansion of the polytetrafluoroethylene in escaping therefrom.

The process is also applicable to the production of articles from copolymers of tetrafluoroethylene, particularly those containing relatively high proportions of tetrafluoroethylene.

The present invention provides a method for the production of novel porous shaped articles of polytetrafluoroethylene which have a variety of useful applications by virtue of their unique combination of such properties as thermostability, resistance to all types of chemical reagents, and excellent electrical properties. Polytetrafluoroethylene is extremely useful in a variety of electrical insulation applications. Although it has an extremely low loss factor in compact form, this loss factor can be decreased still further through the use of porous insulation prepared according to the present invention. The porous articles of this invention have a lower dielectric constant than the compact polymer, and the loss factor of the insulation as a whole is therefore concordantly decreased.

Porous articles prepared according to this process are useful as filter frits, particularly in filtering operations involving corrosive materials such as hot acids, hot alkalies, and all types of organic liquids.

These porous moldings, particularly those having a small pore size, can be soaked in oil and employed as self-lubricating bearings. Saturation with lubricant for this purpose can be advantageously accomplished by quenching the hot article in the desired lubricant immediately following the final sintering operation.

Other uses for porous articles of polytetrafluoroethylene include gas diffusion plates in corrosive liquids, storage battery separators, and porous cells for electrolytic and osmotic operations, particularly in corrosive media.

As many apparently widely different embodiments of this invention may be made without departing from the spirit and scope thereof, it is to be understood that I do not limit myself to the specific embodiments thereof except as defined in the appended claims.

I claim:

1. A process for obtaining porous articles of polytetrafluoroethylene, said process comprising heating polytetrafluoroethylene at a temperature of from 327° C. to 500° C. until it is heated throughout to said temperature, cooling the polymer to a temperature below 327° C., subdividing the cooled polymer to a particle size less than about 20 mesh, forming the finely divided polymer in the shape of the desired article by subjecting it in a mold to superatmospheric pressure at a temperature below 327° C., heating the shaped polymer at a temperature of from 327° C. to 500° C. until it is heated throughout to said temperature, and cooling the resulting article.

2. A process for obtaining porous articles of polytetrafluoroethylene, said process comprising heating polytetrafluoroethylene at a temperature of from 327° C. to 500° C. until it is heated throughout to said temperature, cooling the polymer to room temperature, subdividing the cooled polymer to a particle size less than about 20 mesh, forming the finely divided polymer to the desired shape by subjecting it in a mold to superatmospheric pressure at a temperature below 327° C., removing the shaped polymer from the mold, then heating the shaped polymer at a temperature of from 327° C. to 500° C. until it is heated throughout to said temperature, and then cooling the resulting article.

JOHANNES ALFTHAN.